United States Patent
Kim et al.

(10) Patent No.: US 9,869,908 B2
(45) Date of Patent: Jan. 16, 2018

(54) PIXEL INVERSION ARTIFACT REDUCTION

(71) Applicant: APPLE INC., Cupertino, CA (US)

(72) Inventors: Kyung-Wook Kim, Cupertino, CA (US); Young Bae Park, San Jose, CA (US); Shih Chang Chang, Cupertino, CA (US); Chun-Yao Huang, Cupertino, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 164 days.

(21) Appl. No.: 13/644,395

(22) Filed: Oct. 4, 2012

(65) Prior Publication Data

US 2013/0235020 A1    Sep. 12, 2013

Related U.S. Application Data

(60) Provisional application No. 61/607,531, filed on Mar. 6, 2012.

(51) Int. Cl.
    *G06F 3/041*   (2006.01)
    *G02F 1/1343*  (2006.01)
    *G09G 3/36*    (2006.01)
    *G02F 1/136*   (2006.01)
    *G02F 1/1362*  (2006.01)

(52) U.S. Cl.
    CPC ..... *G02F 1/134363* (2013.01); *G09G 3/3648* (2013.01); *G02F 2001/13606* (2013.01); *G02F 2001/136218* (2013.01); *G09G 3/3614* (2013.01); *G09G 2300/0426* (2013.01); *G09G 2300/0434* (2013.01)

(58) Field of Classification Search
    None
    See application file for complete search history.

(56) References Cited

U.S. PATENT DOCUMENTS

| | | | |
|---|---|---|---|
| 6,724,443 B1 | 4/2004 | Sano et al. | |
| 6,933,568 B2 | 8/2005 | Yang et al. | |
| 7,037,948 B2 | 5/2006 | Hansen et al. | |

(Continued)

FOREIGN PATENT DOCUMENTS

| | | |
|---|---|---|
| CN | 102269902 A | 12/2011 |
| EP | 1939673 A1  | 7/2008 |
| JP | 2004219991 A | 8/2004 |

OTHER PUBLICATIONS

International Partial Search Report for PCT Application No. PCT/US2013/028682 dated May 24, 2013, 2 pgs.

(Continued)

*Primary Examiner* — Amr Awad
*Assistant Examiner* — Donna Lui
(74) *Attorney, Agent, or Firm* — Fletcher Yoder PC

(57) ABSTRACT

A system and device for driving high resolution monitors while reducing artifacts thereon. Utilization of Z-inversion polarity driving techniques to drive pixels in a display reduces power consumption of the display but tends to generate visible horizontal line artifacts caused by capacitances present between the pixels and data lines of the display. By introducing a physical shield between the pixel and data line elements, capacitance therebetween can be reduced, thus eliminating the cause of the horizontal line artifacts. The shield may be a common voltage line (Vcom) of the display.

20 Claims, 12 Drawing Sheets

(56) References Cited

U.S. PATENT DOCUMENTS

| | | |
|---|---|---|
| 7,176,988 B2 | 2/2007 | Song |
| 7,304,691 B2 | 12/2007 | Song et al. |
| 7,483,009 B2 | 1/2009 | Tsubata et al. |
| 7,576,721 B2 | 8/2009 | Tsubata et al. |
| 7,602,385 B2 | 10/2009 | Tsubata et al. |
| 8,115,894 B2 | 2/2012 | Kim et al. |
| 8,605,016 B2 | 12/2013 | Tsubata et al. |
| 2004/0090561 A1 | 5/2004 | Song |
| 2004/0189917 A1 | 9/2004 | Tanaka et al. |
| 2004/0227874 A1 | 11/2004 | Kim et al. |
| 2005/0122458 A1 | 6/2005 | Yang |
| 2007/0171320 A1 | 7/2007 | Lin |
| 2007/0298538 A1* | 12/2007 | Tanabe ............... G02F 1/136213 438/107 |
| 2009/0040442 A1* | 2/2009 | Tanno ............... G02F 1/133555 349/114 |
| 2009/0180069 A1* | 7/2009 | Nishimura ................... 349/139 |
| 2009/0268145 A1* | 10/2009 | Anjo et al. ................... 349/141 |
| 2009/0295769 A1* | 12/2009 | Yamazaki et al. ............ 345/207 |
| 2010/0073273 A1* | 3/2010 | Nam et al. ...................... 345/92 |
| 2010/0301345 A1 | 12/2010 | Lin et al. |
| 2011/0050672 A1* | 3/2011 | Choi ............................ 345/211 |
| 2011/0102309 A1* | 5/2011 | Cho ............................... 345/92 |
| 2011/0149214 A1 | 6/2011 | Yoon |
| 2011/0156995 A1* | 6/2011 | Choi et al. ..................... 345/92 |
| 2011/0298785 A1 | 12/2011 | Al-Dahle et al. |
| 2012/0081273 A1* | 4/2012 | Hsu et al. ...................... 345/55 |
| 2012/0249940 A1* | 10/2012 | Choi et al. ................... 349/123 |
| 2012/0268396 A1* | 10/2012 | Kim et al. .................... 345/173 |

OTHER PUBLICATIONS

PCT International Search Report and Written Opinion for PCT Application No. PCT/US2013/028682 dated Jul. 10, 2013.

* cited by examiner

| DATA POLARITY INVERSION | COLUMN INVERSION | DOT INVERSION | Z INVERSION |
|---|---|---|---|
| POWER CONSUMPTION | FOR EVERY FRAME | FOR EVERY 1 OR 2 LINES | FOR EVERY FRAME |
| POLARITY MAP | LOW 60 | HIGH (HIGHER FOR HI-RES) 60 | LOW 60 |
| IMAGE QUALITY | POOR (V-LINE ARTIFACT) | GOOD | GOOD |

FIG. 7

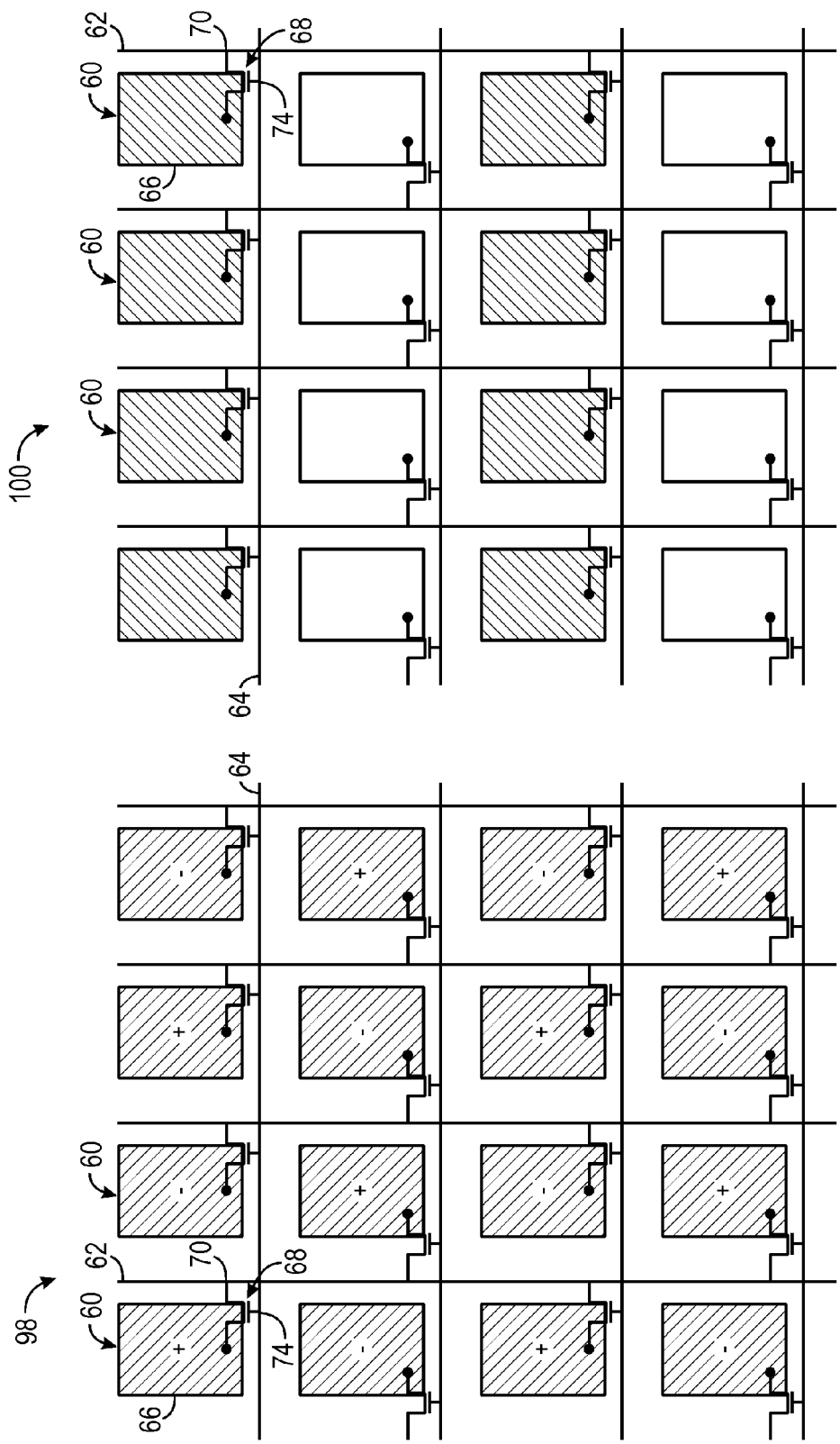

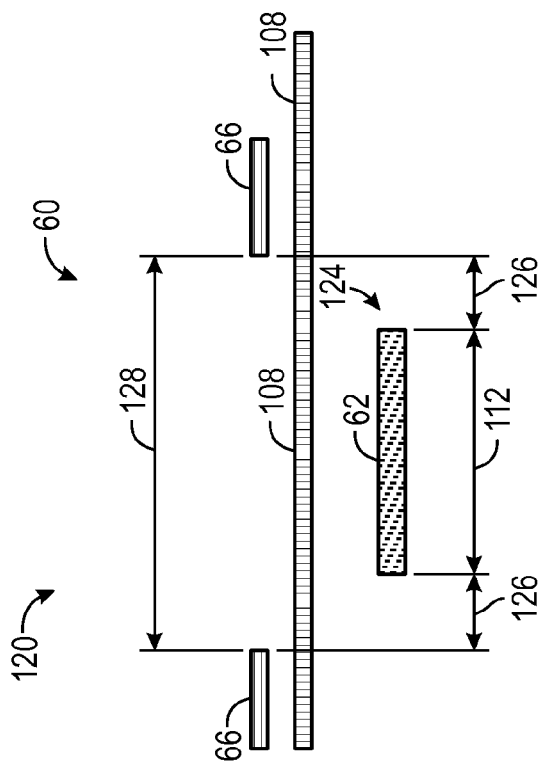
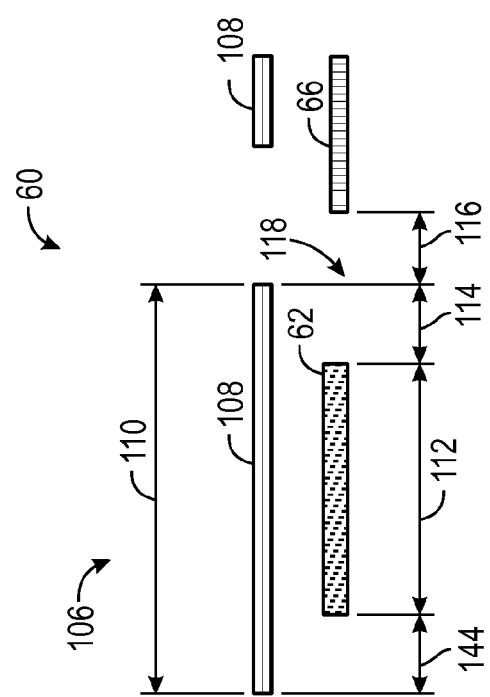

PIXEL INVERSION ARTIFACT REDUCTION

CROSS REFERENCE TO RELATED APPLICATIONS

This application is a Non-Provisional Patent Application of U.S. Provisional Patent Application No. 61/607,531, entitled "Pixel Inversion Artifact Reduction", filed Mar. 6, 2012, which is herein incorporated by reference.

BACKGROUND

The present disclosure relates generally to reducing visual artifacts in a display of a device.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts where it is desirable to minimize power usage.

LCDs typically include an LCD panel having, among other things, a liquid crystal layer and various circuitry for controlling orientation of liquid crystals within the layer to modulate an amount of light passing through the LCD panel and thereby render images on the panel. If a voltage of a single polarity is consistently applied to the liquid crystal layer, a biasing (polarization) of the liquid crystal layer may occurs such that the light transmission characteristics of the liquid crystal layer may be disadvantageously altered.

To aid in preventing this biasing of the liquid crystal layer, periodic inversion of the electric field applied to the liquid crystal layer may be utilized. Furthermore, various inversion techniques may be utilized to reduce visual artifacts caused by slight differences in the value of applied positive and negative voltages during the periodic inversion of the electric field applied to the liquid crystal layer. For example, a dot inversion method may cause each adjacent pixel location in the liquid crystal layer to be driven with a voltage opposite of its neighboring pixels over a given time frame. This technique may greatly reduce the generation of visual artifacts on the LCD, however, it may require a substantial amount of power to perform. Accordingly, there is a need for low power inversion techniques that minimize the generation of visual artifacts on an LCD.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A system and device for driving high resolution monitors while reducing artifacts thereon. Utilization of Z-inversion polarity driving techniques to drive pixels in a display reduces power consumption of the display with overall good image quality. Moreover, Z-inversion polarity driving techniques are accompanied by particular techniques of coupling pixel elements of a pixel array of a liquid crystal display (LCD) to data lines of the LCD, which may lead to parasitic capacitances being generated, causing visible artifacts. By introducing a physical shield between the pixel and data line elements, capacitance therebetween can be reduced, thus eliminating the cause of the horizontal line artifacts. The shield may be a common voltage line (Vcom) of the display.

BRIEF DESCRIPTION OF THE DRAWINGS

Various aspects of this disclosure may be better understood upon reading the following detailed description and upon reference to the drawings in which:

FIG. 7 is table illustrating driving techniques of the LCD of FIG. 4 in accordance with aspects of the present disclosure;

FIG. 9 is a block diagram of one of the arrangements of unit pixels of FIG. 8 in accordance with aspects of the present disclosure;

FIG. 10 is a block diagram of an arrangements of unit pixels of the LCD of FIG. 4 in accordance with aspects of the present disclosure;

FIG. 12 is a side view of an embodiment of a unit pixel 60 of the LCD of FIG. 4 in accordance with aspects of the present disclosure;

FIG. 13 is a side view of another embodiment of a unit pixel 60 of the LCD of FIG. 4 in accordance with aspects of the present disclosure.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain embodiments of the present disclosure are generally directed to reducing power consumption by an electronic display, such as an LCD, through driving an array of pixels in a display with alternating positive and negative voltages to aid in prevent biasing of the pixels in the display. For example, one technique includes utilizing a Z-inversion polarity driving technique to drive columns of the array of pixels while generating a polarity map analogous to utilization of a dot inversion polarity driving technique. To utilize this Z-inversion polarity driving technique, the array of pixels may be set up in a particular manner in which thin film transistors are oppositely coupled to data lines on a line by line basis. This configuration can lead to parasitic capacitances between the data lines and pixel elements in the array of pixels. To reduce and/or remove this capacitance, a common voltage line may be disposed between the pixel elements and the data lines to shield any capacitance therebetween. Additionally, this positioning of the common voltage common voltage line may allow for reduction of the size of a passive layer in the unit pixels of the pixel array, reducing overall power consumption. In this manner, a Z-inversion polarity driving technique may be utilized in conjunction with a high resolution display (e.g., a display with 1000 or more horizontal gate lines therein).

Figure 1:
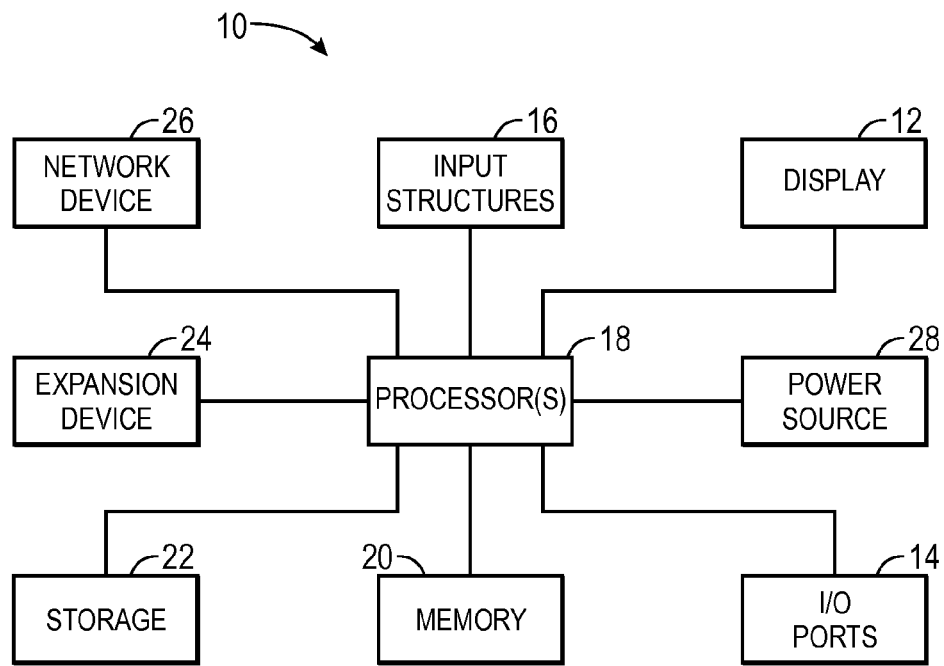
FIG. 1 is a block diagram of an electronic device in accordance with aspects of the present disclosure.

As may be appreciated, electronic devices may include various internal and/or external components which contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12, input/output (I/O) ports 14, input structures 16, one or more processors 18, one or more memory devices 20, non-volatile storage 22, expansion card(s) 24, networking device 26, and power source 28.

The display 12 may be used to display various images generated by the electronic device 10. The display 12 may be any suitable display, such as a liquid crystal display (LCD) or an organic light-emitting diode (OLED) display. Additionally, in certain embodiments of the electronic device 10, the display 12 may be provided in conjunction with a touch-sensitive element, such as a touchscreen, that may be used as part of the control interface for the device 10.

The I/O ports 14 may include ports configured to connect to a variety of external devices, such as a power source, headset or headphones, or other electronic devices (such as handheld devices and/or computers, printers, projectors, external displays, modems, docking stations, and so forth). The I/O ports 14 may support any interface type, such as a universal serial bus (USB) port, a video port, a serial connection port, an IEEE-1394 port, an Ethernet or modem port, and/or an AC/DC power connection port.

The input structures 16 may include the various devices, circuitry, and pathways by which user input or feedback is provided to processor(s) 18. Such input structures 16 may be configured to control a function of an electronic device 10, applications running on the device 10, and/or any interfaces or devices connected to or used by device 10. For example, input structures 16 may allow a user to navigate a displayed user interface or application interface. Non-limiting examples of input structures 16 include buttons, sliders, switches, control pads, keys, knobs, scroll wheels, keyboards, mice, touchpads, and so forth. Additionally, in certain embodiments, one or more input structures 16 may be provided together with display 12, such an in the case of a touchscreen, in which a touch sensitive mechanism is provided in conjunction with display 12.

Processors 18 may provide the processing capability to execute the operating system, programs, user and application interfaces, and any other functions of the electronic device 10. The processors 18 may include one or more microprocessors, such as one or more "general-purpose" microprocessors, one or more special-purpose microprocessors or ASICS, or some combination of such processing components. For example, the processors 18 may include one or more reduced instruction set (RISC) processors, as well as graphics processors, video processors, audio processors, and the like. As will be appreciated, the processors 18 may be communicatively coupled to one or more data buses or chipsets for transferring data and instructions between various components of the electronic device 10.

Programs or instructions executed by processor(s) 18 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by the processors 18 to enable device 10 to provide various functionalities, including those described herein.

The instructions or data to be processed by the one or more processors 18 may be stored in a computer-readable medium, such as a memory 20. The memory 20 may include a volatile memory, such as random access memory (RAM), and/or a non-volatile memory, such as read-only memory (ROM). The memory 20 may store a variety of information and may be used for various purposes. For example, the memory 20 may store firmware for electronic device 10 (such as basic input/output system (BIOS)), an operating system, and various other programs, applications, or routines that may be executed on electronic device 10. In addition, the memory 20 may be used for buffering or caching during operation of the electronic device 10.

The components of the device 10 may further include other forms of computer-readable media, such as non-volatile storage 22 for persistent storage of data and/or instructions. Non-volatile storage 22 may include, for example, flash memory, a hard drive, or any other optical, magnetic, and/or solid-state storage media. Non-volatile storage 22 may be used to store firmware, data files, software programs, wireless connection information, and any other suitable data.

The embodiment illustrated in FIG. 1 may also include one or more card or expansion slots. The card slots may be configured to receive one or more expansion cards 24 that may be used to add functionality, such as additional memory, I/O functionality, or networking capability, to electronic device 10. Such expansion cards 24 may connect to device 10 through any type of suitable connector, and may be accessed internally or external to the housing of electronic device 10. For example, in one embodiment, expansion cards 24 may include a flash memory card, such as a SecureDigital (SD) card, mini- or microSD, CompactFlash card, Multimedia card (MMC), or the like. Additionally, expansion cards 24 may include one or more processor(s) 18 of the device 10, such as a video graphics card having a GPU for facilitating graphical rendering by device 10.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The device 10 may also include a power source 28. In one embodiment, the power source 28 may include one or more batteries, such as a lithium-ion polymer battery or other type of suitable battery. Additionally, the power source 28 may include AC power, such as provided by an electrical outlet, and electronic device 10 may be connected to the power source 28 via a power adapter. This power adapter may also be used to recharge one or more batteries of device 10.

Figure 2:
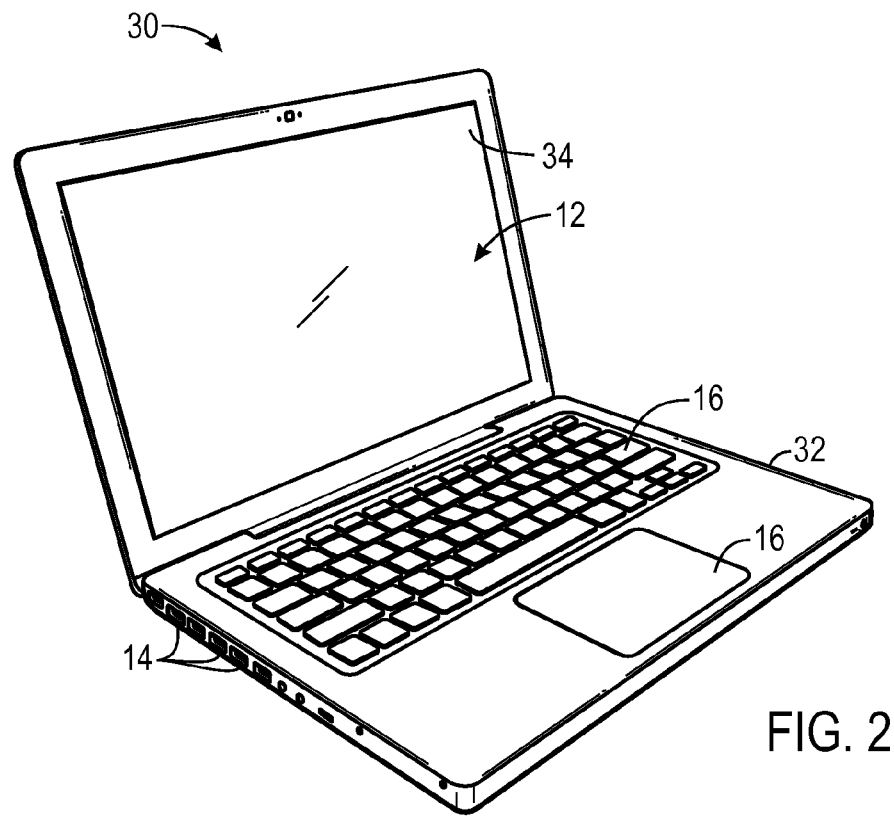
FIG. 2 is a perspective view of a computer in accordance with aspects of the present disclosure.

The electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may include a model of a MacBook®, MacBook® Pro, MacBook Air®, iMac®, Mac® mini, or Mac® Pro available from Apple Inc. of Cupertino, Calif. By way of example, an electronic device 10 in the form of a laptop computer 30 is illustrated in FIG. 2 in accordance with one embodiment. The depicted computer 30 includes a housing 32, a display 12 (e.g., in the form of an LCD 34 or some other suitable display), I/O ports 14, and input structures 16.

The display 12 may be integrated with the computer 30 (e.g., such as the display of the depicted laptop computer) or may be a standalone display that interfaces with the computer 30 using one of the I/O ports 14, such as via a DisplayPort, Digital Visual Interface (DVI), High-Definition Multimedia Interface (HDMI), or analog (D-sub) interface. For instance, in certain embodiments, such a standalone display 12 may be a model of an Apple Cinema Display®, available from Apple Inc.

Figure 3:
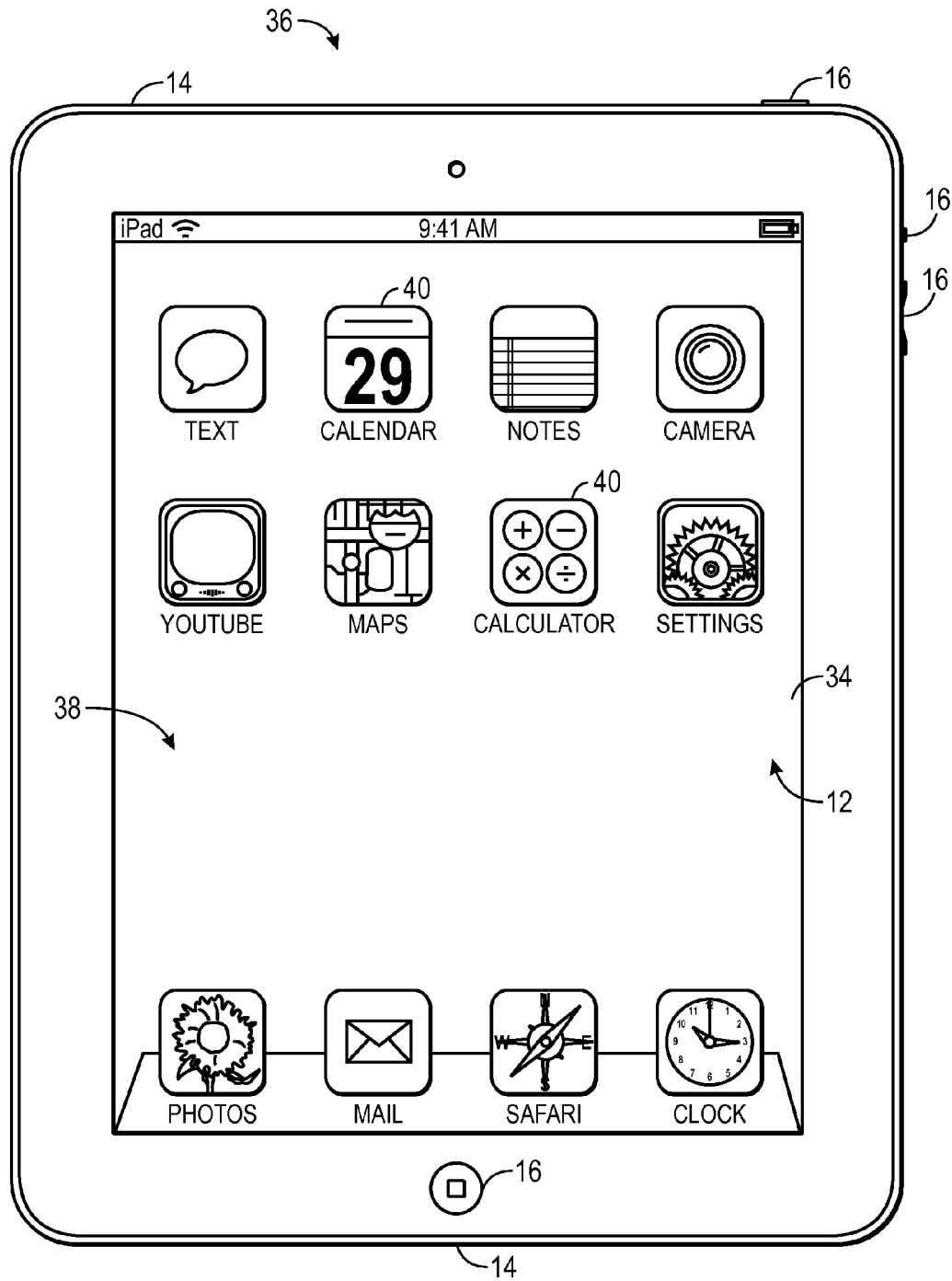
FIG. 3 is a perspective view of a handheld electronic device in accordance with aspects of the present disclosure.

Although an electronic device 10 is generally depicted in the context of a computer in FIG. 2, an electronic device 10 may also take the form of other types of electronic devices. In some embodiments, various electronic devices 10 may include mobile telephones, media players, personal data organizers, handheld game platforms, cameras, and combinations of such devices. For instance, as generally depicted in FIG. 3, the device 10 may be provided in the form of handheld electronic device 36 that includes various functionalities (such as the ability to take pictures, make telephone calls, access the Internet, communicate via email, record audio and video, listen to music, play games, and connect to wireless networks). By way of further example, handheld device 36 may be a model of an iPad®, iPod®, or iPhone® available from Apple Inc.

Handheld device 36 of the presently illustrated embodiment includes a display 12, which may be in the form of an LCD 34. The LCD 34 may display various images generated by the handheld device 36, such as a graphical user interface (GUI) 38 having one or more icons 40. In one embodiment, the LCD 34 may be a high resolution display with 1000 or more horizontal gate lines present therein. The device 36 may also include various I/O ports 14 to facilitate interaction with other devices, and user input structures 16 to facilitate interaction with a user.

Figure 4:
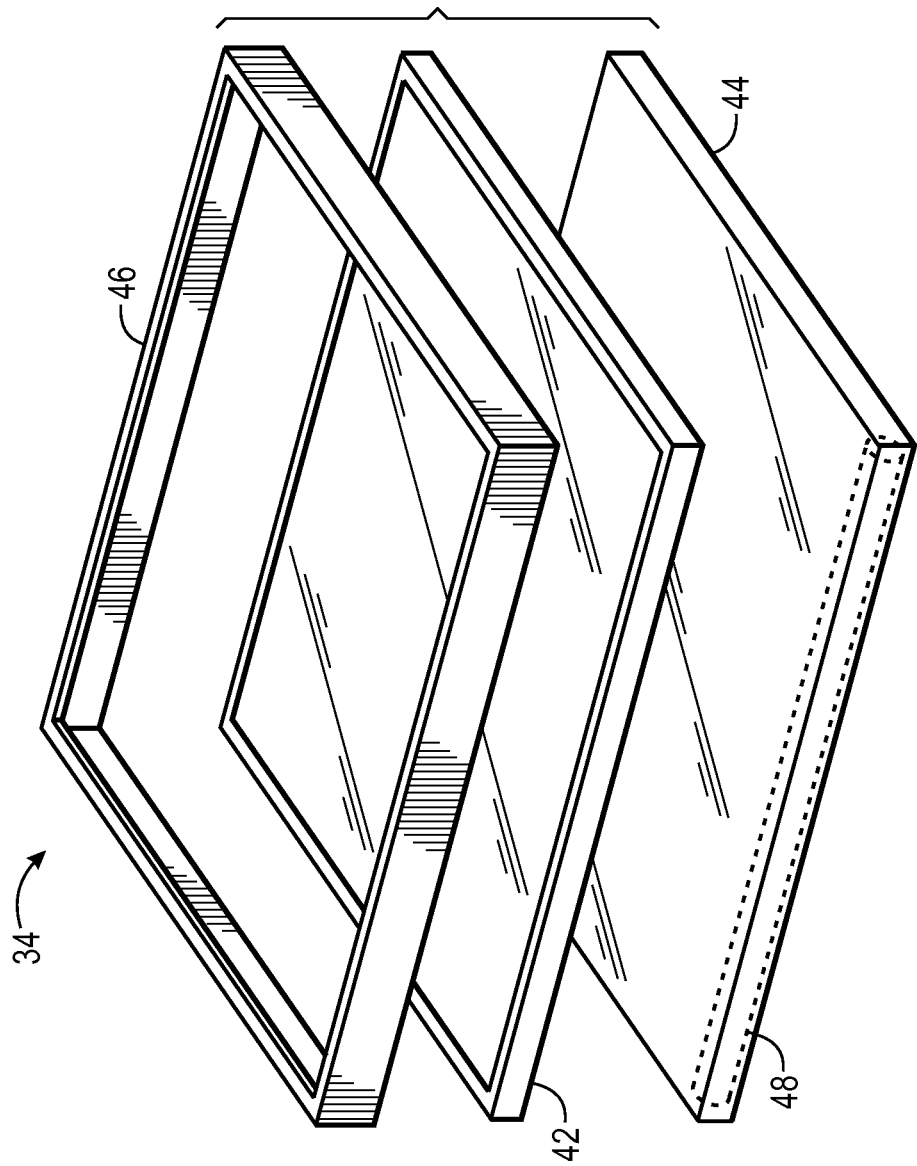
FIG. 4 is an exploded view of a liquid crystal display (LCD) in accordance with aspects of the present disclosure.

One example of an LCD display 34 is depicted in FIG. 4 in accordance with one embodiment. The depicted LCD display 34 includes an LCD panel 42 and a backlight unit 44, which may be assembled within a frame 46. As may be appreciated, the LCD panel 42 may include an array of pixels configured to selectively modulate the amount and color of light passing from the backlight unit 44 through the LCD panel 42. For example, the LCD panel 42 may include a liquid crystal layer, one or more thin film transistor (TFT) layers configured to control orientation of liquid crystals of the liquid crystal layer via an electric field, and polarizing films, which cooperate to enable the LCD panel 42 to control the amount of light emitted by each pixel. Additionally, the LCD panel 42 may include color filters that allow specific colors of light to be emitted from the pixels (e.g., red, green, and blue).

The backlight unit 44 includes one or more light sources 48. Light from the light source 48 is routed through portions of the backlight unit 44 (e.g., a light guide and optical films) and generally emitted toward the LCD panel 42. In various embodiments, light source 48 may include a cold-cathode fluorescent lamp (CCFL), one or more light emitting diodes (LEDs), or any other suitable source(s) of light. Further, although the LCD 34 is generally depicted as having an edge-lit backlight unit 44, it is noted that other arrangements may be used (e.g., direct backlighting) in full accordance with the present technique.

Figure 5:
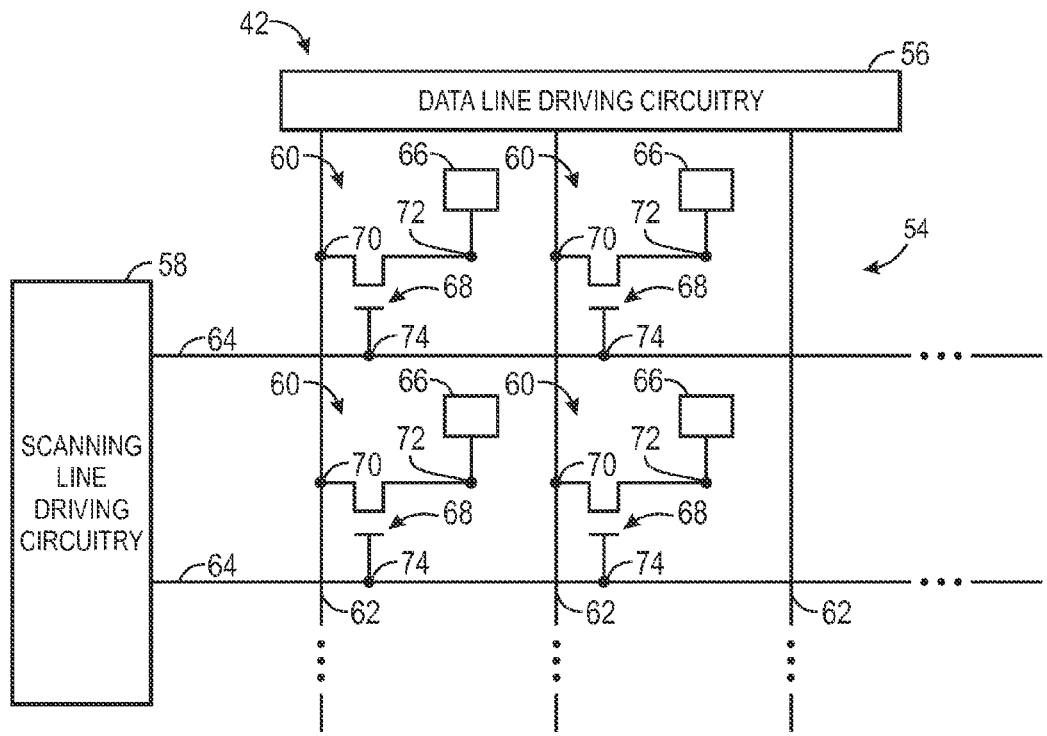
FIG. 5 graphically depicts circuitry that may be found in the LCD of FIG. 4 in accordance with aspects of the present disclosure.

Referring now to FIG. 5, an example of a circuit view of pixel-driving circuitry found in an LCD 34 is provided. For example, the circuitry depicted in FIG. 5 may be embodied on the LCD panel 42 described above with respect to FIG. 4. The pixel-driving circuitry includes an array or matrix 54 of unit pixels 60 that are driven by data (or source) line driving circuitry 56 and scanning (or gate) line driving circuitry 58. As depicted, the matrix 54 of unit pixels 60 forms an image display region of the LCD 34. In such a matrix, each unit pixel 60 may be defined by the intersection of data lines 62 and scanning lines 64, which may also be referred to as source lines 62 and gate (or video scan) lines 64. The data line driving circuitry 56 may include one or more driver integrated circuits (also referred to as column drivers) for driving the data lines 62. The scanning line driving circuitry 58 may also include one or more driver integrated circuits (also referred to as row drivers).

Each unit pixel 60 includes a pixel electrode 66 and thin film transistor (TFT) 68 for switching the pixel electrode 66. In the depicted embodiment, the source 70 of each TFT 68 is electrically connected to a data line 62 extending from respective data line driving circuitry 56, and the drain 72 is electrically connected to the pixel electrode 66. Similarly, in the depicted embodiment, the gate 74 of each TFT 68 is electrically connected to a scanning line 64 extending from respective scanning line driving circuitry 58.

In one embodiment, column drivers of the data line driving circuitry 56 send image signals to the pixels via the respective data lines 62. Such image signals may be applied by line-sequence, i.e., the data lines 62 may be sequentially activated during operation. The scanning lines 64 may apply scanning signals from the scanning line driving circuitry 58 to the gate 74 of each TFT 68. Such scanning signals may be applied by line-sequence with a predetermined timing or in a pulsed manner.

Each TFT 68 serves as a switching element which may be activated and deactivated (i.e., turned on and off) for a predetermined period based on the respective presence or absence of a scanning signal at its gate 74. When activated, a TFT 68 may store the image signals received via a respective data line 62 as a charge in the pixel electrode 66 with a predetermined timing.

The image signals stored at the pixel electrode 66 may be used to generate an electrical field between the respective pixel electrode 66 and a common electrode. Such an electrical field may align liquid crystals within a liquid crystal layer to modulate light transmission through the LCD panel 42. Unit pixels 60 may operate in conjunction with various color filters, such as red, green, and blue filters. In such embodiments, a "pixel" of the display may actually include multiple unit pixels, such as a red unit pixel, a green unit pixel, and a blue unit pixel, each of which may be modulated to increase or decrease the amount of light emitted to enable the display to render numerous colors via additive mixing of the colors.

In some embodiments, a storage capacitor may also be provided in parallel to the liquid crystal capacitor formed between the pixel electrode 66 and the common electrode to prevent leakage of the stored image signal at the pixel electrode 66. For example, such a storage capacitor may be provided between the drain 72 of the respective TFT 68 and a separate capacitor line.

Figure 6:
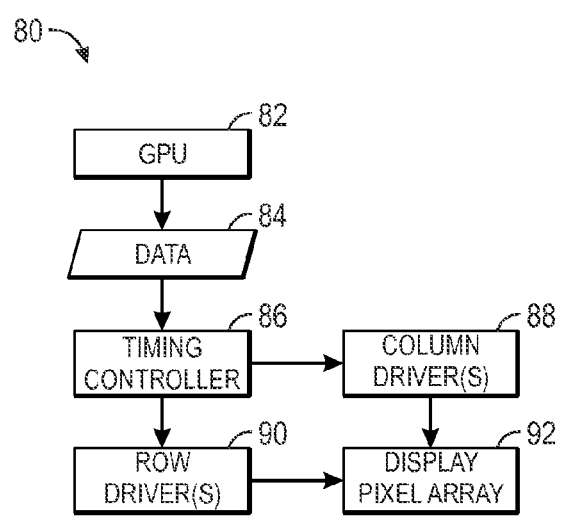
FIG. 6 is a block diagram representative of how the LCD of FIG. 4 receives data and drives a pixel array of the LCD in accordance with aspects of the present disclosure.

Certain components for processing image data and rendering images on an LCD 34 based on such data are depicted in block diagram 80 of FIG. 6 in accordance with an embodiment. In the illustrated embodiment, a graphics processing unit (GPU) in block 82, or some other processor 18, transmits data in block 84 to a timing controller in block 86 of the LCD 34. The data generally includes image data that may be processed by circuitry of the LCD 34 to drive the unit pixels 60 of, and render an image on, the LCD 34. The timing controller, in block 86, may then send signals to, and control operation of, one or more column drivers (or other data line driving circuitry 56) in block 88 and one or more row drivers in block 90 (or other scanning line driving circuitry 58). These column drivers and row drivers may generate analog signals for driving the various unit pixels 60 of a pixel array of the LCD 34 in block 92 to generate images on the LCD 34.

If the pixel array of the LCD 34 is driven at a voltage of a particular polarity, electric and chemical changes may occur in the unit pixels 60, thereby lowering the display 12 sensitivity and brightness over time as the driving voltage of the same polarity is applied to the LCD 34. To overcome this, polarity inversion driving techniques may be utilized. Three such techniques are illustrated in FIG. 7.

FIG. 7 illustrates a table 94 that illustrates three polarity driving techniques. These techniques include column inversion, line inversion, and Z-inversion. The column inversion polarity driving technique is performed by driving, for example, odd columns of unit pixels 60 of the LCD 34 with a positive driving voltage and even columns of unit pixels 60 of the LCD 34 with a negative driving voltage during a first frame and, subsequently, driving odd columns of unit pixels 60 of the LCD 34 with a negative driving voltage and even columns of unit pixels 60 of the LCD 34 with a positive driving voltage during a second subsequent frame. This process may be repeated for subsequent frames, where each frame represents the rate at which, for example, the GPU 82 can feed an entire set of new data to the display 12. Advantages of this column inversion technique include relatively low power consumption. However, this technique tends to produce visual artifacts on the display 12 (e.g., a user may perceive differences in the respective columns of unit pixels 60 due to differences in the magnitudes of the positive and negative driving voltages as vertical line artifacts).

To overcome the inherent image quality shortcomings of column inversion, a dot inversion polarity driving technique may be implemented instead. Dot inversion is performed by driving, for example, a unit pixel 60 in the first row and column of the LCD 34 with a positive driving voltage and while driving a unit pixel 60 in the first row and second column of the LCD 34 with a negative driving voltage during a first frame and, subsequently, reversing the polarity of the driving voltages in a second subsequent frame. This process may be repeated for subsequent frames across all of the unit pixels 60 of the LCD 34. Additionally, the unit pixels 60 may be driven in groups of two such that the unit pixels 60 in the first column and first and second rows of the LCD 34 may be driven to a positive voltage while the unit pixels 60 in the second column and first and second rows of the LCD 34 may be driven to a negative voltage in a first frame and, subsequently each group of two unit pixels 60 described above may be driven by an opposite polarity driving voltage in a second subsequent frame. Again, this process may be repeated for subsequent frames across all of the unit pixels 60 of the LCD 34. Advantages of this dot inversion technique include reduction of the visual artifacts present using the column inversion polarity driving technique, however, the dot inversion polarity driving technique may consume a large amount of power.

A third polarity driving technique is illustrated in table 94, Z-inversion. Z-inversion is performed by driving unit pixels 60 in the LCD in a manner similar to the column inversion technique described above, while generating a visual polarity map consistent with that of the dot inversion polarity driving technique. By driving the unit pixels 60 in a manner similar to the column inversion technique, relatively low amounts of power may be consumed. However, by generating a polarity map analogous to that generated by the dot inversion polarity driving technique, the Z-inversion polarity driving technique allows for image quality on par with the dot inversion polarity driving technique.

Figure 8:
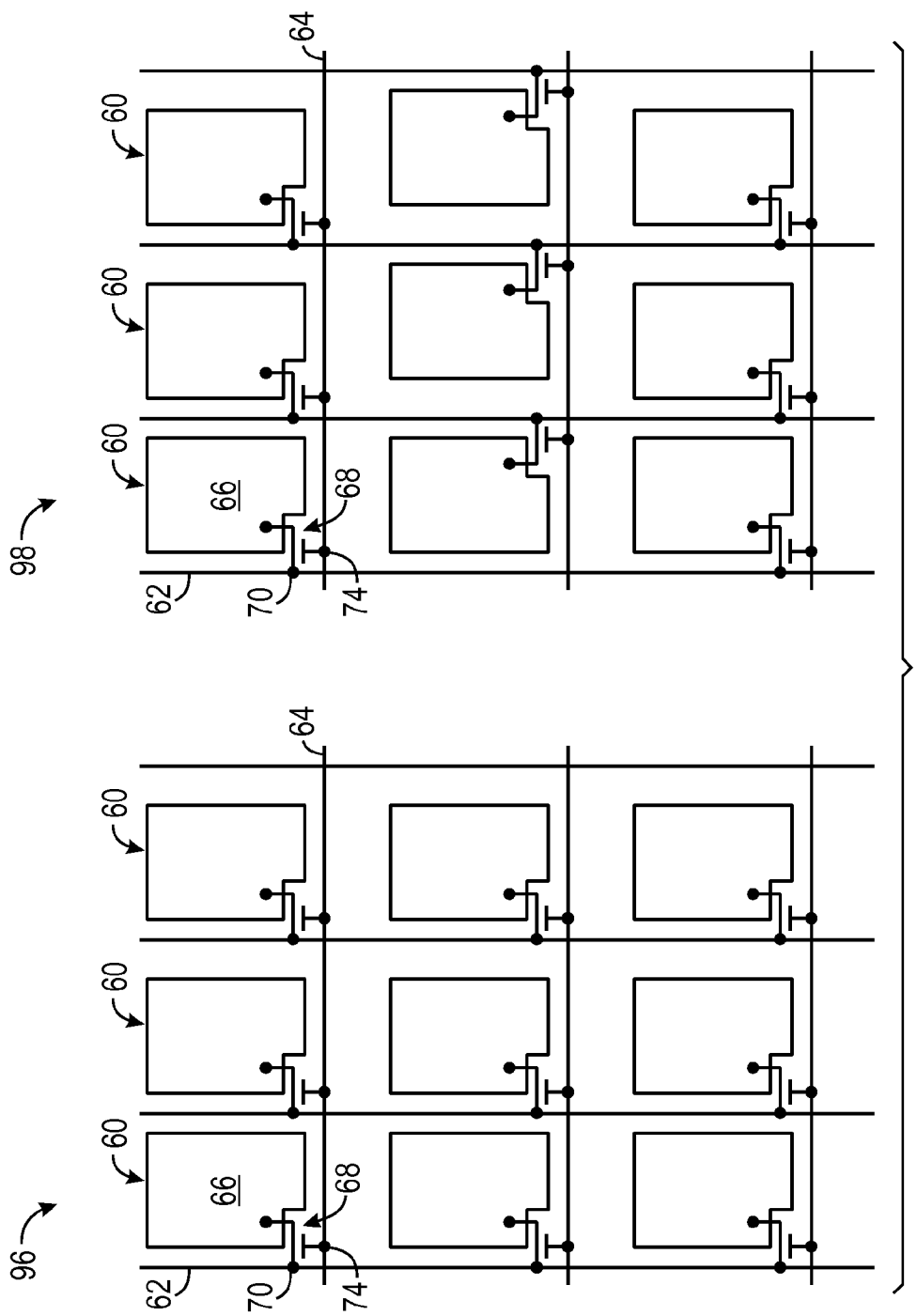
FIG. 8 is a block diagram of arrangements of unit pixels of the LCD of FIG. 4 in accordance with aspects of the present disclosure.

FIG. 8 illustrates an arrangement 96 of unit pixels 60 of the LCD 34 for use with a dot inversion polarity driving technique, as well as an arrangement 98 of unit pixels 60 of the LCD 34 for use with a Z-inversion polarity driving technique. As illustrated, each of the unit pixels 60 in the arrangement 96 are coupled to a respective data line 62 in a similar fashion. For example, as illustrated, each of TFTs 68 of the unit pixels 60 in the arrangement 96 may be coupled to a data line 62 immediately adjacent the leftmost side of the unit pixels 60. This is in contrast to the arrangement 98 of unit pixels 60 whereby the TFTs 68 of the unit pixels 60 may be oppositely coupled to the data lines 62 in a line by line manner. For example, the TFTs 68 of the unit pixels 60 in the first column and first and third rows of the arrangement 98 may be coupled to the data line 62 immediately adjacent the leftmost side of the unit pixels 60 in the first column of the arrangement 98, while the TFT 68 of the unit pixel 60 in the first column and the second row of the arrangement 98 may be coupled to the data line 62 immediately adjacent the rightmost side of the unit pixel 60 in the first column and second row of the arrangement 98. This configuration may be repeated throughout the arrangement 98 of unit pixels 60 of the LCD 34 to allow for a Z-inversion polarity driving technique to be implemented. That is, positive and negative driving voltages may be transmitted along the columns of the arrangement 98 with a resulting polarity map analogous to that generated by the dot inversion polarity driving technique (as previously illustrated in FIG. 7). This polarity map is also illustrated in FIG. 9.

FIG. 9 illustrates the pixel arrangement 98 of FIG. 8 when being driven by a Z-inversion polarity driving technique. As illustrated, the leftmost data line 62 may drive a positive polarity voltage during a frame while the data line 62 to the right of the leftmost data line 62 may drive a negative polarity voltage during that same frame. This causes the unit pixels 60 in the first and third rows of the first column and the unit pixels 60 in the second and fourth rows of the second column of the arrangement 98 to be driven with a positive drive voltage. Simultaneously, the unit pixels 60 in the second and fourth rows of the first column and the unit pixels 60 in the first and third rows of the second column of the arrangement 98 are driven with a negative drive voltage. This allows for a polarity arrangement similar to that generated with a dot inversion polarity driving technique while driving the columns of the arrangement 98 in a manner similar to a column inversion polarity driving technique. However, on occasion, configuration of the arrangement 98 of unit pixels 60 of the LCD 34 may be imprecise. This may lead to issues such as those illustrated in FIG. 10.

FIG. 10 illustrates a pixel arrangement 100 of unit pixels 60 that may be utilized in conjunction with Z-inversion polarity driving technique. Pixel arrangement 100 may differ from pixel arrangement 98 of FIGS. 8 and 9 in that pixel arrangement 100 includes unit pixels 60 that have been shifted too close to data lines 62. This may cause an alignment shift of the location of the unit pixels 60 and may lead to pixel grey error (shift in the grayscale values of the unit pixels). For example, alignment shifts of the unit pixels 60 of a distance of 1.5 μm may result in a 4/255 grey level difference in the grayscale of the LCD 34, and may cause a dim horizontal artifact to be viewable by a user, for example, in the second and fourth rows of the pixel arrangement 100. A root cause of this horizontal artifact generation issue is illustrated in FIG. 11.

Figure 11:
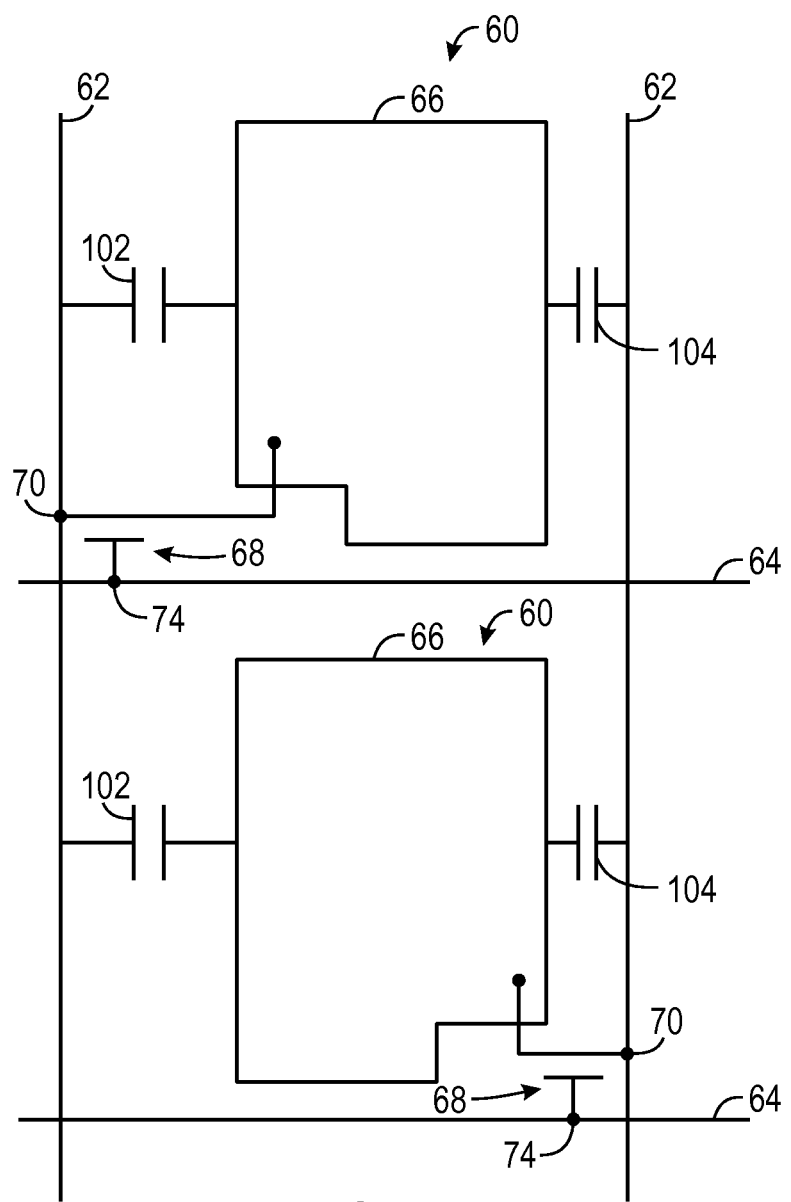
FIG. 11 is a block diagram of pixel units of FIG. 10 in accordance with aspects of the present disclosure.

FIG. 11 illustrates two unit pixels 60 of the pixel arrangement 100 of FIG. 10. As illustrated, the topmost unit pixel 60 includes a TFT 68 coupled to a data line 62 that may transmit a positive drive voltage ($V_{d+}$) during a particular frame. The bottommost unit pixel 60 includes a TFT 68 coupled to a data line 62 that may transmit a negative drive voltage ($V_{d+}$) during the same frame. As illustrated, each of capacitances may be generated between the data lines 62 and the pixel electrodes 66 of the unit pixels 60. For example, a first data to pixel capacitance ($C_{dp1}$) 102 may be generated between the unit pixels 60 and the leftmost data line. Similarly, a second data to pixel capacitance ($C_{dp2}$) 104 may be generated between the unit pixels 60 and the rightmost data line. $C_{dp1}$ 102 and $C_{dp2}$ 104 may be parasitic capacitances that, taken together with differences in $V_{d+}$ and $V_{d-}$, may cause pixel voltage differences between even and odd lines of the pixel arrangement 100 of FIG. 10. FIG. 12 further illustrates the parasitic capacitance (e.g., $C_{dp1}$ 102 and/or $C_{dp2}$ 104) generated between a data line 62 and a pixel electrode 66 of a unit pixel 60.

FIG. 12 illustrates a side view of an embodiment 106 of a unit pixel 60 that may include a pixel electrode 66 adjacent a data line 62. In this embodiment 106, the unit pixel 60 includes a common voltage line ($V_{COM}$) 108 that supplies a common (i.e., reference) voltage to a common electrode of the pixel electrode 66 (e.g., to provide a common potential to the common electrodes of the pixel elements 66 for generating of an electric field therein). As illustrated, the $V_{COM}$ 108 may be formed substantially parallel to, as well as above, data line 62.

As may be appreciated, the $V_{COM}$ 108 may extend for a distance 110 of approximately, for example, 8.5 μm. Data line 62 may extend a distance 112 of approximately, for example, 3.5 μm, centered below the $V_{COM}$ 108 (i.e., with distance 114 of approximately 2.5 μm on each side of the data line 62). The data line 62 may also be separated from the pixel element 66 by a distance 116 of approximately, for example, 2.0 μm. It is in this distance 116 that the parasitic capacitance 118 (e.g., $C_{dp1}$ 102 and/or $C_{dp2}$ 104) between the data line 62 and pixel element 66 may occur.

FIG. 13 illustrates a side view of a second embodiment 120 of a unit pixel 60 that may include pixel electrodes 66 adjacent a data line 62 and separated by the $V_{COM}$ 108. In this embodiment 120, $V_{COM}$ 108 may act as a shield to block the electric field between the pixel electrodes 66 and the data line 62. In this manner, by using the $V_{COM}$ 108 as a shield, no additional layers need be added to the unit pixel 60 while shielding of pixel electrodes 66 and the data line 62 is effected. Thus, as illustrated by element 124, the parasitic capacitance 118 (e.g., $C_{dp1}$ 102 and $C_{dp2}$ 104) of FIG. 12 is shielded.

Furthermore, the distance between pixels may be reduced in the embodiment 120 set forth in FIG. 13. As may be appreciated, data line 62 may extend a distance 112 of approximately, for example, 3.5 μm. However, the distance 126 between the data line 62 and the pixel elements 66 may be reduced to, for example, approximately 2.5 μm. However, no additional distance, such as distance 116 of FIG. 12, need be present between the data line 62 and pixel elements 66 due to the layout of the unit pixel 60 in the embodiment 120. This may allow for an increased number of unit pixels 60 in the LCD 34, which may allow for greater image quality. For example, the pixel elements 66 may be separated by a distance 128 of, for example, 8.5 μm. In another embodiment, the data line 62 may extend a distance 112 of approximately, for example, 3.5 μm, the distance 126 between the data line 62 and the pixel elements 66 may be, for example, approximately 5.75 μm, and the pixel elements 66 may be separated by a distance 128 of, for example, approximately 4.5 μm. Again, no additional distance, such as distance 116 of FIG. 11, need be present in this embodiment.

Figure 14:
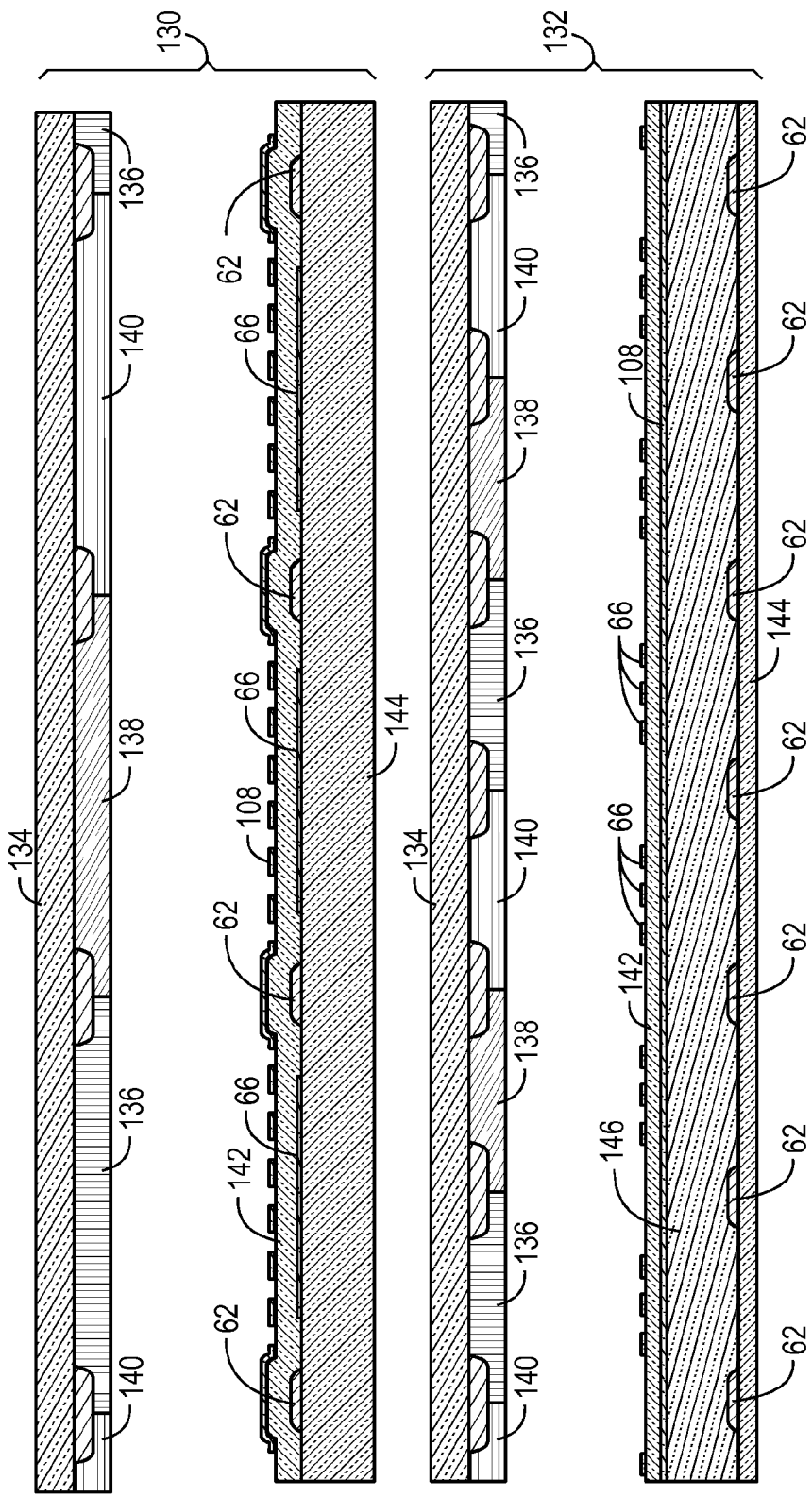
FIG. 14 illustrates a side view layout of a pixel arrangements of unit pixels 60 of the LCD of FIG. 4 in accordance with aspects of the present disclosure.

FIG. 14 illustrates a side view layout of a pixel arrangement 130 of unit pixels 60 and a pixel arrangement 132 of unit pixels 60 that may be utilized in conjunction with Z-inversion polarity driving technique. Pixel arrangement 130 includes a color filter glass substrate 134 covering red 136, green 138, and blue 140 pixels. Also illustrated in pixel arrangement 130 is $V_{COM}$ 108 (which may be made of indium tin oxide), pixel elements 66 (which may also include indium tin oxide), data lines 62, a gate insulator 142 (for example, SiNx) of approximately, for example, 0.6 μm, and a TFT glass substrate 144. As previously established, this configuration may lead to parasitic capacitance 118 (e.g., $C_{dp1}$ 102 and/or $C_{dp2}$ 104) between the data line 62 and pixel element 66.

Pixel arrangement 132 also includes a color filter glass substrate 134 covering red 136, green 138, and blue 140 pixels. As illustrated, the pixel arrangement 132 allows for a greater number of pixels to be present relative to the pixel arrangement 130. Also illustrated in pixel arrangement 132 is $V_{COM}$ 108 (which may be made of indium tin oxide), pixel elements 66 (which may also include indium tin oxide), data lines 62, a gate insulator 142 (for example, SiNx) of approximately, for example, 0.6 μm, and a TFT glass substrate 144. In the pixel arrangement 132, the gate insulator 142 may be reduced in depth to approximately, for example, 0.6 μm. Additionally, the pixel arrangement 132 may include an organic coat layer 146 of approximately between 0.5 μm and 5 μm, approximately between 1 μm and 1.7 μm, or approximately 0.5 μm, 1 μm, 1.5 μm, 2 μm, 2.5 μm, 3 μm, 3.5 μm, 4 μm, 4.5 μm, or 5 μm. This organic coat layer 146 may be, for example, a photo-acrylic layer that operates to reduce capacitance loading between data lines 62 and $V_{COM}$ 108 and may be a low dielectric (e.g., ∈<4) material. Moreover, it should be noted that in addition to providing additional numbers of pixels for an LCD 34, the configuration in pixel arrangement 132 may remove parasitic capacitance 118 (e.g., $C_{dp1}$ 102 and/or $C_{dp2}$ 104) between data lines 62 and pixel elements 66 through use of the $V_{COM}$ 108 as a shield.

Figure 15:
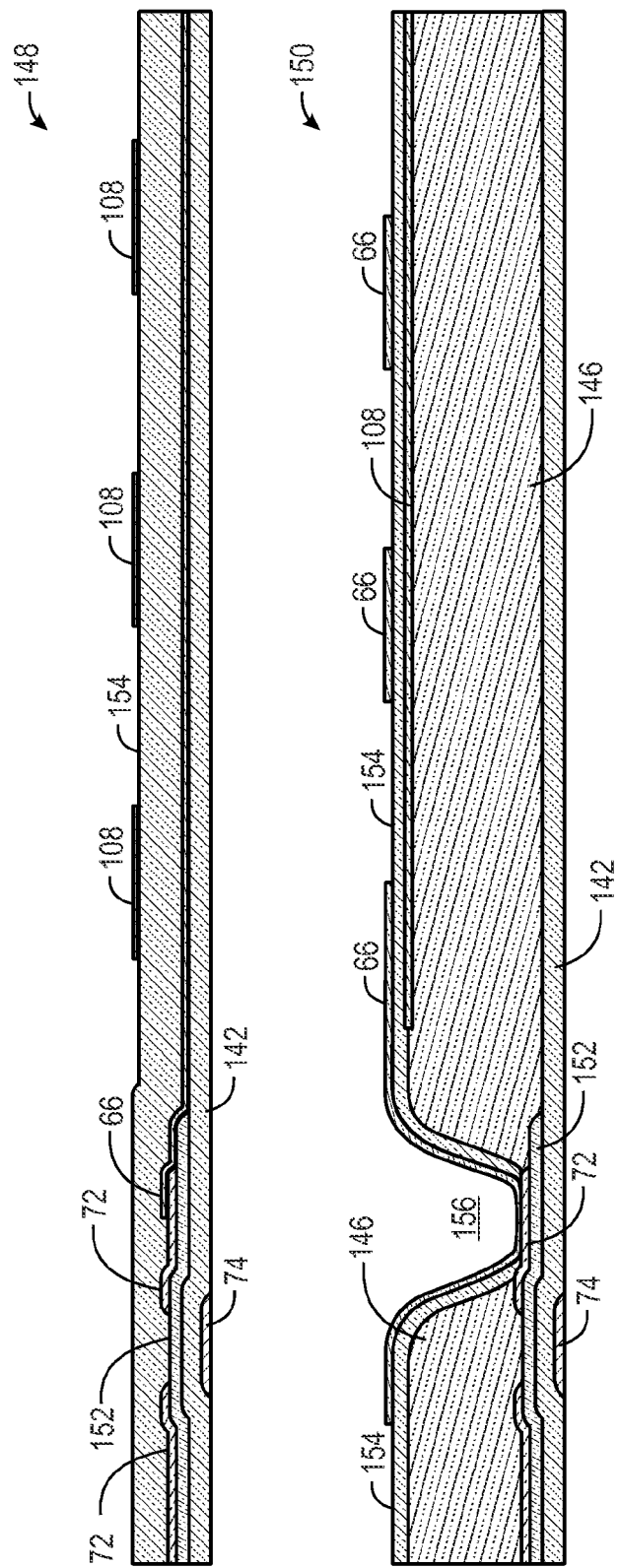
FIG. 15 illustrates another side view layout of a pixel arrangements of unit pixels 60 of the LCD of FIG. 4 in accordance with aspects of the present disclosure.

FIG. 15 illustrates a side view layout of the pixel arrangement 148 of unit pixels 60 and a pixel arrangement 150 of unit pixels 60 that may be utilized in conjunction with Z-inversion polarity driving technique. Pixel arrangement 148 includes $V_{COM}$ 108 (which may be made of indium tin oxide), pixel elements 66 (which may also include indium tin oxide), a drain 72 and gate 74 of a TFT 68, and a gate insulator 142 (for example, SiNx). Pixel arrangement 148 may also include an active layer 152 (e.g., a hydrogenated amorphous silicon (a-Si:H) layer) and a passive layer 154 (for example, SiNx). This passive layer 154 may, for example, be present between the pixel elements 66 and the $V_{COM}$ 108 to allow for interaction between the pixel elements 66 and the $V_{COM}$ 108 (i.e., to properly turn on the pixel element 66). As illustrated, the passive layer 154 may be approximately 6000 Å.

Pixel arrangement 150 also includes $V_{COM}$ 108 (which may be made of indium tin oxide), pixel elements 66 (which may also include indium tin oxide), a drain 72 and gate 74 of a TFT 68, and a gate insulator 142 (for example, SiNx). Pixel arrangement 150 may further include an active layer 152 (e.g., a hydrogenated amorphous silicon (a-Si:H) layer) and a passive layer 154 (for example, SiNx). This passive layer 154 may, for example, be present between the pixel elements 66 and the $V_{COM}$ 108 to allow for interaction between the pixel elements 66 and the $V_{COM}$ 108 (i.e., to properly turn on the pixel element 66). However, this passive layer 154 may be reduced in depth relative to the passive layer 154 present in pixel arrangement 148. The passive layer 154 of the pixel arrangement 150 may be approximately between 1000 and 3000 Å. Reduction in the depth of the passive layer 154 may be desirable because it reduces the pixel driving voltage required for the LCD 34, thus reducing overall power consumption of a device 36.

Additionally, the pixel arrangement 150 may include an organic coat layer 146 of approximately between 0.5 μm and 5 μm, approximately between 1 μm and 1.7 μm, or approximately 0.5 μm, 1 μm, 1.5 μm, 2 μm, 2.5 μm, 3 μm, 3.5 μm, 4 μm, 4.5 μm, or 5 μm. This organic coat layer 146 may be, for example, a photo-acrylic layer that operates to reduce capacitance loading between data lines 62 and $V_{COM}$ 108. In view of this organic coat layer 146, to allow for connections between the pixel elements 66 and, for example, the drain 72 of the TFT 68, an aperture 156 may be present in the pixel arrangement 150. This aperture 156 may allow for a physical connection between pixel elements 66 and the drain 72 of the TFT 68. Furthermore, as may be appreciated, the configuration in pixel arrangement 150 may remove parasitic capacitance 118 (e.g., $C_{dp1}$ 102 and/or $C_{dp2}$ 104) between data lines 62 and pixel elements 66 through use of the $V_{COM}$ 108 as a shield, as previously discussed.

Figure 16:
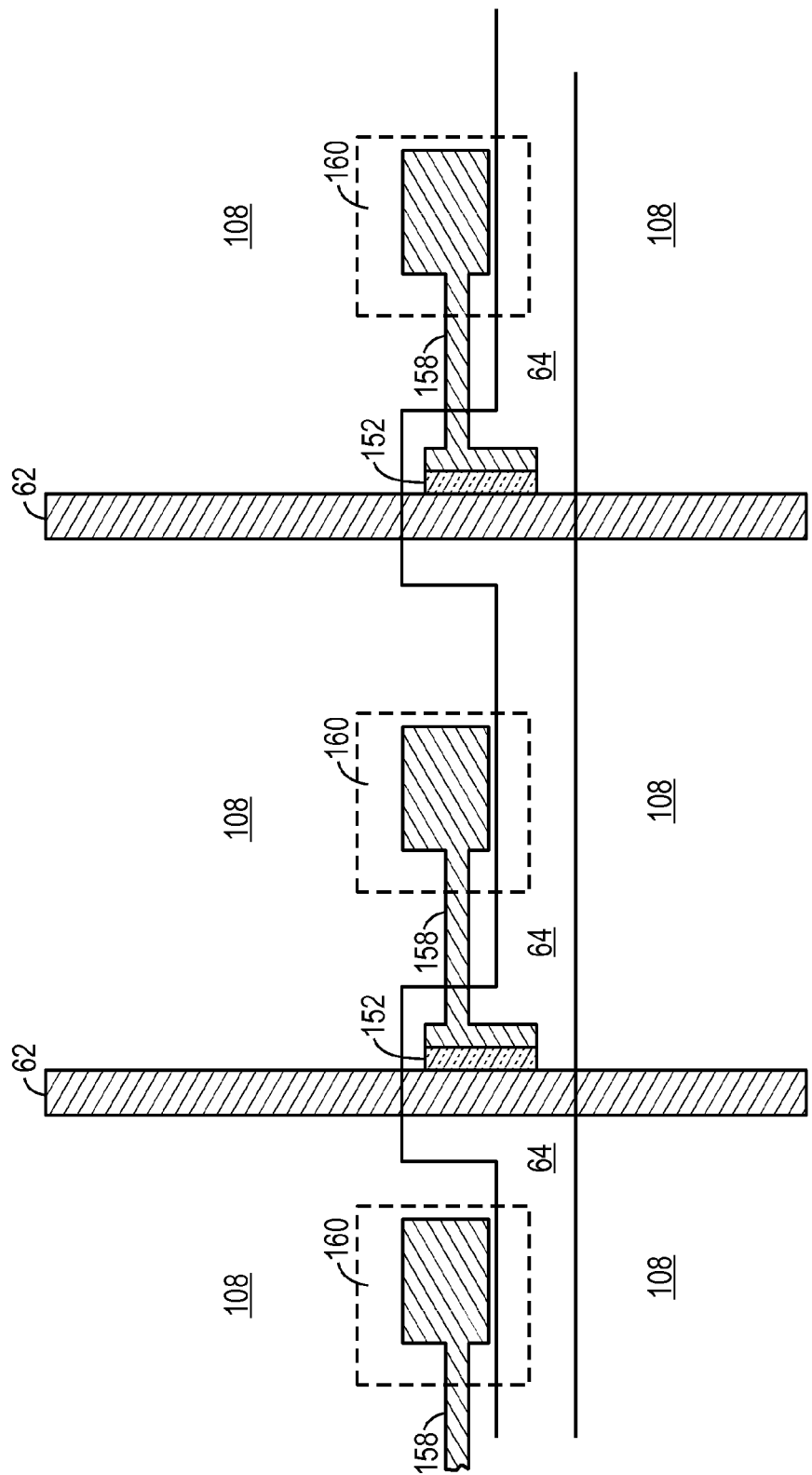
FIG. 16 illustrates a top view of the common voltage line ($V_{COM}$) of FIG. 13 during fabrication in accordance with aspects of the present disclosure.

FIG. 16 illustrates a top view of the $V_{COM}$ 108 during fabrication of the LCD 34. As illustrated, the $V_{COM}$ 108 may overlay data lines 62, gate line 64, active layer 152 (e.g., a hydrogenated amorphous silicon (a-Si:H) layer, which may be a TFT channel), and a data metal layer 158 (e.g., a metal substrate layer). However, the $V_{COM}$ 108 does not overlay segments 160 (i.e., no indium tin oxide overlays segments 160) so that, for example, vias may be subsequently generated without interrupting the $V_{COM}$ 108. In this manner, the $V_{COM}$ 108 overlays a channel (active layer 152) of the TFT 68 to forms a transparent Vcom plane, which may be designed to form network connection crossing pixels. For example, the connections between n−1 to nth horizontal lines can across over the channels (active layer 152) of the TFTs 68, thus maximizing current flow capability of the Vcom plane. Moreover, due to low dielectric property of photo-acrylic interlayer (e.g., ∈<4), the Vcom 108 disposed over the channels (active layer 152) of the TFTs 68 will not cause abnormal operational characteristics of the TFTs 68. That is, the configuration shown in FIG. allows for a Vcom 108 to be disposed over the TFTs 68 when it would normally not be possible.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display panel comprising:
    a unit pixel comprising:
        a pixel element; and
        a transistor having a drain coupled to the pixel element and a gate;
        a shielding conductor disposed below at least a portion of the pixel element, wherein the shielding conductor is configured to shield a parasitic capacitance of the pixel element; and
        a passive layer interposed below at least the portion of the pixel element and above the shielding conductor to allow for interaction between the pixel element and the shielding conductor, wherein the passive layer comprises a thickness between approximately 1000 Å and 3000 Å across an entirety of the passive layer, wherein the passive layer is configured to allow for reduced pixel driving voltage of the unit pixel based on the thickness of the passive layer.

2. The display panel of claim 1, wherein the shielding conductor comprises a transparent conductor.

3. The display panel of claim 2, wherein the shielding conductor comprises an indium tin oxide composition.

4. The display panel of claim 1, wherein the shielding conductor comprises a common voltage line ($V_{COM}$) configured to supply a reference voltage to a common electrode of the pixel element.

5. The display panel of claim 1, wherein the shielding conductor is aligned substantially parallel to a data line.

6. The display panel of claim 5, wherein the pixel element is disposed at a distance of approximately less than 6 μm from the data line in a direction along the shielding conductor.

7. The display panel of claim 5, wherein the pixel element is disposed at a distance of approximately less than 3 μm from the data line in a direction along the shielding conductor.

8. The display panel of claim 1, wherein the unit pixel is configured to be coupled to a data line in conjunction with a z-inversion polarity driving technique of the display panel.

9. The display panel of claim 1, wherein the transistor comprises a source coupled to a data line, wherein the transistor is configured to pass a data signal from the data line to the pixel element upon receipt of an activation signal from the gate line.

10. The display panel of claim 9, wherein the shielding conductor is interposed between the pixel element and the data line and configured to shield parasitic capacitance between the data line and the pixel element.

11. A display comprising:
a unit pixel comprising a pixel electrode;
a coating layer;
a shielding conductor disposed directly on the coating layer and below at least a portion of the pixel electrode, wherein the shielding conductor is configured to shield a parasitic capacitance of the pixel electrode; and
a passive layer interposed below at least the portion of the pixel electrode and above the shielding conductor, wherein the passive layer comprises a thickness between approximately 1000 Å and 3000 Å across an entirety of the passive layer, wherein the passive layer is configured to allow for reduced pixel driving voltage of the unit pixel based on the thickness of the passive layer.

12. The display of claim 11, wherein the pixel electrode is disposed directly on the passive layer.

13. The display of claim 11, wherein the passive layer comprises a thickness of less than 1 μm.

14. The panel of claim 11, wherein the coating layer comprises an organic coat layer configured to reduce a capacitance between a data line and the shielding conductor.

15. The panel of claim 14, wherein the coating layer comprises a photo-acrylic material having a dielectric constant of less than approximately four.

16. The display of claim 15, wherein the organic coat layer comprises a thickness of less than approximately 5 μm.

17. A display comprising:
a pixel electrode;
a transistor configured to be activated to transmit an image signal to the pixel electrode, wherein the transistor is directly coupled to the pixel electrode;
a shielding conductor disposed below at least a portion of the pixel electrode of the display, wherein the shielding conductor is configured to shield a parasitic capacitance of the pixel electrode; and
a passive layer interposed below at least the portion of the pixel electrode and above the shielding conductor, wherein the pixel electrode is disposed partially on the passive layer, wherein the passive layer comprises a thickness between approximately 1000 Å and 3000 Å across an entirety of the passive layer, wherein the passive layer is configured to allow for reduced pixel driving voltage of the unit pixel based on the thickness of the passive layer.

18. The display of claim 17, wherein the passive layer comprises silicon nitride.

19. The display of claim 17, comprising an organic coat layer configured to reduce a capacitance between a data line and the shielding conductor.

20. The display of claim 19, wherein the organic coat layer comprises a photo-acrylic material having a thickness of approximately between 0.5 μm and 5 μm.

* * * * *

UNITED STATES PATENT AND TRADEMARK OFFICE
CERTIFICATE OF CORRECTION

PATENT NO. : 9,869,908 B2
APPLICATION NO. : 13/644395
DATED : January 16, 2018
INVENTOR(S) : Kyung-Wook Kim et al.

Page 1 of 1

It is certified that error appears in the above-identified patent and that said Letters Patent is hereby corrected as shown below:

In the Claims

Column 13, Line 21, Claim 9 replace "gate" with --data--.
Column 14, Line 5, Claim 14 replace "panel" with --display--.
Column 14, Line 8, Claim 15 replace "panel" with --display--.
Column 14, Line 29, Claim 17 replace "unit pixel" with --pixel electrode--.

Signed and Sealed this
Tenth Day of November, 2020

Andrei Iancu
*Director of the United States Patent and Trademark Office*